United States Patent

[11] 3,582,145

[72] Inventors Gail E. Janssen;
 Henry N. Wildenberg, both of Kaukauna, Wis.
[21] Appl. No. 887,842
[22] Filed Dec. 24, 1969
[45] Patented June 1, 1971
[73] Assignee Badger Northland Inc.
 Kaukauna, Wis.

[54] SILAGE DISTRIBUTOR
 8 Claims, 5 Drawing Figs.
[52] U.S. Cl. .................................................. 302/60,
 214/17C
[51] Int. Cl. ...................................................... B65g 53/04
[50] Field of Search .......................................... 214/17 C;
 302/60; 193/17—19, 29

[56] References Cited
 UNITED STATES PATENTS
3,105,722 10/1963 Thompson ................... 302/60
3,357,749 12/1967 Seymour al. ................. 214/17CX Primary Examiner—Robert G. Sheridan
Attorney—Gerhardt, Greenlee and Farris ABSTRACT: A material distributor for distributing silage in a silo including a blower, a pipe to carry material from the blower, an adapter for attaching the pipe to the blower and for allowing the pipe to turn relative to the blower, a hood assembly attached to the pipe for directing material into the silo, and a lever for controlling the hood assembly. The lever is pivotally attached to the adapter. By moving the lever in a horizontal plane, the pipe is turned thereby turning the hood and changing the direction in which material is discharged from the hood. By moving the lever in a vertical plane, the lever adjusts an outer portion of the hood, which is connected to the lever through a cable, to adjust the angle at which material is discharged from the hood. A cam plate with a predetermined number of spaced slots is attached to the base of the adapter to hold the lever in any one of a number of positions which will deposit silage in a predetermined area within the silo. The point at which the cable is attached to the lever is adjustable so that the same distribution pattern for the material deposited within the silo can be maintained as the silo is filled.

INVENTORS.
GAIL E. JANSSEN
BY HENRY N. WILDENBERG

ATTORNEYS.

INVENTORS.
GAIL E. JANSSEN
BY HENRY N. WILDENBERG

ATTORNEYS

3,582,145

SILAGE DISTRIBUTOR

This invention relates to a silo distributor for distributing material in a silo. More particularly, this invention relates to a control means for a pipe and hood assembly for directing silage from a blower to predetermined areas within a silo.

It is desirable when filling a silo to distribute the material within the silo so that the material stored in the silo at any given height above the floor of the silo has a uniform density and so that the pressure exerted on the walls of the silo is uniform. If the pressure exerted on the walls of the silo is not uniform around the circumference of the silo at any given level above the floor of the silo, damage to the silo could result. When silage is deposited in one location in the silo, a hard core is developed leaving soft spots around the edge of the core. The capacity of the silo is also decreased by having the soft spots. In addition to possible damage to the silo's structure and loss of silage due to spoilage, hard spots and soft spots may also create considerable difficulty when using mechanical means to remove material from the silo.

In order to obtain uniform density of the material stored in a silo and to prevent hard cores of material from developing within a silo, silage distributors are provided to deposit silage in various areas of the silo during filling. One type silage distributor which is currently on the market has a hood for directing silage from the blower pipe into a silo. The hood is movable about a vertical axis to determine the direction in which the material is discharged into the silo. A section of the hood is movable to vary the angle at which material leaves the hood. The hood is usually oscillated about the vertical axis by a crank arm and a connecting rod which turn the hood back and forth through an angle of about 60°. The section of the hood which is moved to vary the angle at which the material leaves the hood is usually connected to the drive mechanism by a cable. The drive mechanism which usually includes a motor and a speed reduction gear box continuously oscillates the hood about the vertical axis and moves the section of the hood to vary the angle at which material leaves the hood so as to distribute material along the walls of the silo.

Silage distributors with a motor to continuously oscillate the hood about a vertical axis and to reciprocate the section of the hood which controls the angle at which material is discharged from the hood have some disadvantages. Initial cost is high, maintenance is required, power is required to operate the distributor, and distribution is not even. The distribution of material in the silo is uneven because the rate at which the hood oscillates about the vertical axis varies continuously from zero to a maximum rate and back to zero.

The material distributor of this invention overcomes the disadvantages of a material distributor with a motor to continuously oscillate a hood about a vertical axis and to reciprocate a section of the hood which controls the angle at which material is discharged from the hood by providing a material distributor which includes a blower, a pipe for conveying material from the blower to the top of the silo, an adapter for attaching the pipe to the blower discharge and for allowing the pipe to turn relative to the blower discharge, and a hood assembly attached to the discharge end of the pipe for directing material to various parts of the silo. The hood assembly includes first and second portions. The first portion is fixed relative to the pipe. The second portion is moveable relative to the first portion to vary the angle at which material is discharged from the hood assembly. A lever which is moveable in a first plane to turn the pipe relative to the blower and to thereby change the direction in which material is discharged from the hood assembly is included. A cable means is attached to the second portion of the hood assembly and to said lever. The lever is moveable in a second plane to control the angle at which material is discharged from the hood. A cam is provided to position the lever in any one of two or more positions each of which locates the lever in a predetermined position in the first and second planes to deposit material in a preselected position in the silo.

The nature of the invention will become more fully apparent hereinafter as the description thereof proceeds, reference being made to the drawings in which.

Figure 1:
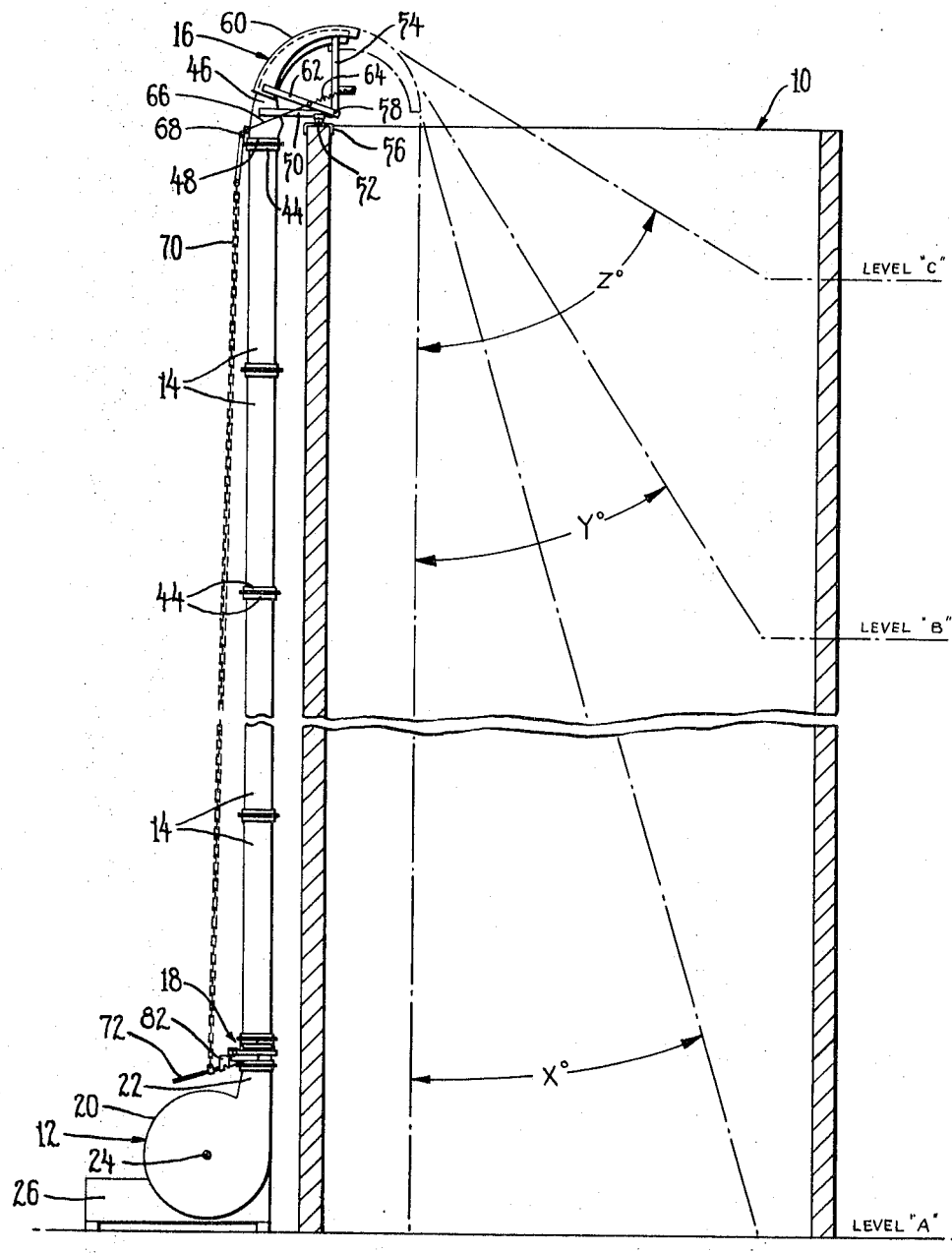
FIG. 1 is an elevational view partly broken away and in section, of a typical silo which is provided with the improved material distributing mechanism of this invention.

A silo 10 is shown in FIG. 1. A blower assembly 12 for elevating material and depositing it within the silo is positioned adjacent to the silo 10. A series of pipes 14 and a hood assembly 16 are attached to the blower assembly 12 by an adapter assembly 18 for directing material from the blower into the silo. The blower assembly 12 includes an impeller housing 20 with a blower outlet pipe 22. An impeller shaft 24 rotatably supports an impeller within the impeller housing 20. The impeller shaft 24 is usually driven by a tractor power takeoff. A conveyor 26 is provided to convey material into the impeller housing 20.

The pipes 14 are connected to the blower outlet pipe 22 by the adapter assembly 18. The adapter assembly 18 includes a flange 30 which is attached to a flange 28 on the blower outlet pipe 22. A base 32 for the adapter assembly 18 is formed by a section of pipe attached to the flange 30. A sliding ring 34 is slideably supported on the upper portion of the base 32. A short ring 36 is pivotally attached to the sliding ring 34 by a pair of rivets 38 that form a horizontal pivotal axis perpendicular to the axis of the short ring 36. A top flange 40 is pivotally attached to the short ring 36 by a pair of rivets 42 for pivotal movement about a horizontal axis which is perpendicular to the axis of the short ring 36 and the axis formed by the rivets 38. A pipe 14 with a flange 44 on each end is attached to the top flange 40 of the adapter assembly 18. The pivotal axis for connecting the short ring 36 to the sliding ring 34 and the pivotal axis for connecting the short ring 36 to the top flange 40 are needed to provide for slight misalignment between the blower assembly 12 and the pipes 14. A number of pipe sections 14 with the flange 44 on each end are connected together by the flanges 44 to extend from the adapter assembly 18 to a point near the top of the silo 10.

The hood assembly 16 with the first portion 46 that includes a flange 48 is connected to the flange 44 of the upper section of pipe 14. The first portion 46 of the hood assembly 16 is also pivotally attached to a spindle 52 by a pair of arms 50 and a pair of arms 54. The spindle 52 is attached to the top of the silo 10 by a U-shaped member 56. The second portion 60 of the hood assembly 16 is pivotally attached to the arms 50 and 54 by a shaft 58 and a pair of arms 62 for pivotal movement about a horizontal axis. The second portion 60 of the hood assembly is a curved open bottom channel with a U-shaped cross section which telescopes over the upper outer surface of the first portion 46. The first portion 46 of the hood assembly 16 deflects material conveyed by the blower assembly 12 from a vertical path to a substantially horizontal path. The second portion 60 of the hood assembly 16 is adjustable relative to the first portion 46 to vary the angle at which material conveyed by the blower assembly 12 is discharged from the hood assembly 16. The hood assembly 16 can be adjusted to obtain any predetermined discharge angle between horizontal and substantially vertically downward. The second portion 60 of the hood assembly 16 is controlled by a spring 64 which tends to rotate the second portion 60 clockwise about the shaft 58 as shown in FIG. 1. The second portion 60 of the hood assembly 16 is rotated in a counterclockwise direction about the axis of the shaft 58 by a cable 66. The cable 66 has one end attached to each of the arms 62. The cable 66 thus forms a loop which runs around a pair of pulleys 68 and is attached to a chain 70. By turning the hood assembly 16 about the spindle 52 to change the direction at which material leaves the hood assembly and by adjusting the second portion 60 of the hood assembly 16 to vary the angle at which material leaves the hood assembly 16, material can be deposited in any section of this silo 10.

Figure 3:
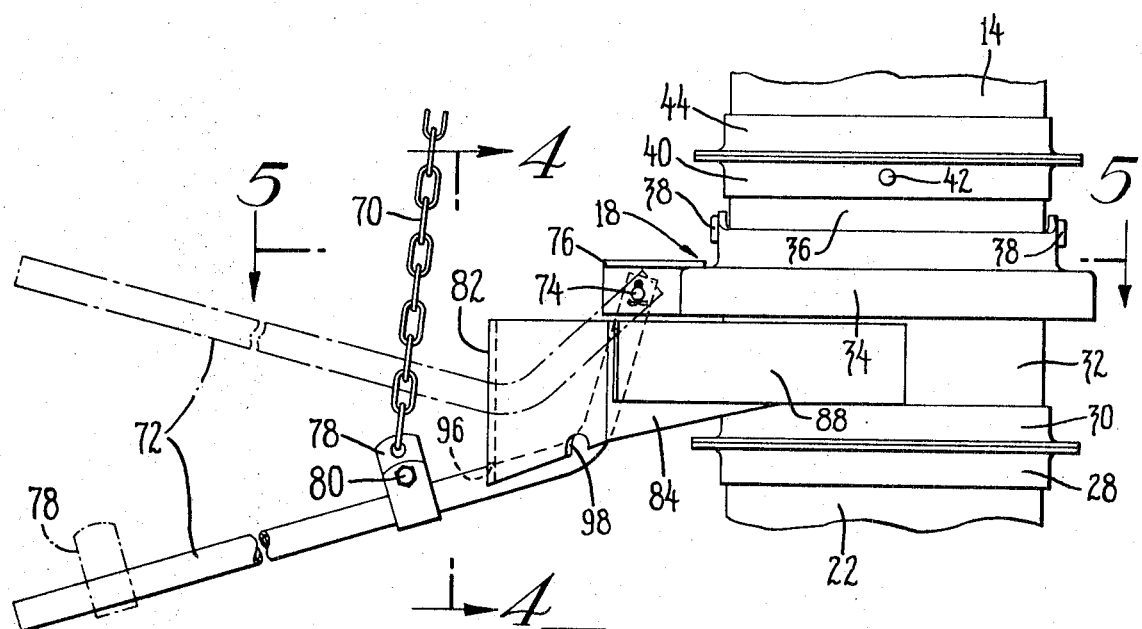
FIG. 3 is an enlarged detailed elevational view of the material distributor control assembly.
Figure 4:
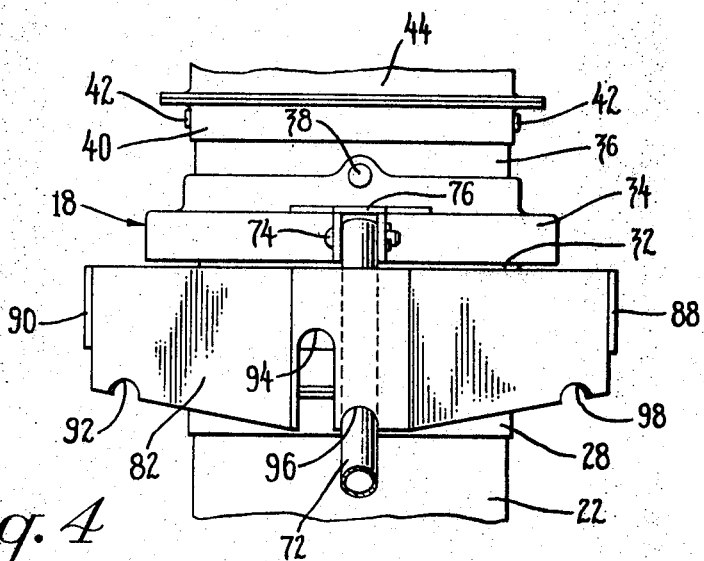
FIG. 4 is a sectional view of the material distributor control apparatus taken along lines 4-4 of FIG. 3.
Figure 5:
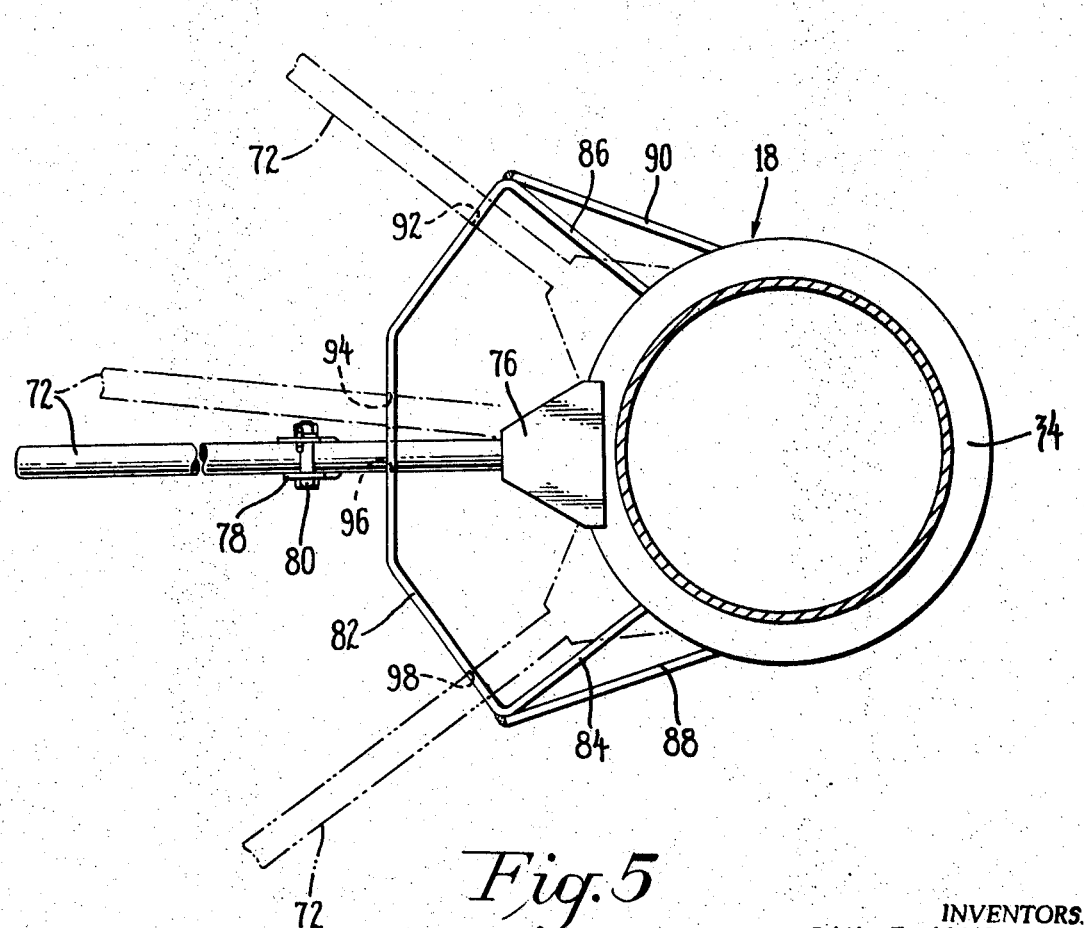
FIG. 5 is a sectional view of the material distributor control apparatus taken along lines 5-5 of FIG. 3.

The control means for controlling the hood assembly 16 is best shown in FIGS. 3, 4, and 5. A lever arm 72 is pivotally attached by a pin 74 to a bracket 76. The bracket 76 is rigidly attached to the sliding ring 34. By moving the lever arm 72 in a horizontal plane, the sliding ring 34 is turned relative to the base 32 of the adapter assembly 18. This results in the pipe sections 14 being turned about their vertical axis. As a result the hood assembly 16 is turned about the spindle 52 to change the direction in which material is discharged from the hood assembly. The chain 70 is attached to the lever arm 72 by a bracket 78 and a bolt 80. By loosening the bolt 80 the bracket 78 may be slid along the lever arm 72 to a position shown by the broken line in FIG. 3 or to any other desired position along the lever arm 72. By pivoting the lever arm 72 in a vertical plane about the pin 74 the chain 70 causes the second portion 60 of the hood assembly to rotate about the shaft 58 and thereby controls the angle at which material is discharged from the hood assembly 16.

A cam plate 82 is attached to the base 32 of the adapter assembly 18 by arms 84 and 86 and braces 88 and 90. The cam plate 82 includes a series of slots 92, 94, 96, and 98 of various depths for holding the lever 72 in preselected positions in vertical and horizontal planes. The number of slots provided is preferably four. For a large diameter silo it would be desirable to have additional slots to obtain more even material distribution.

Figure 2:
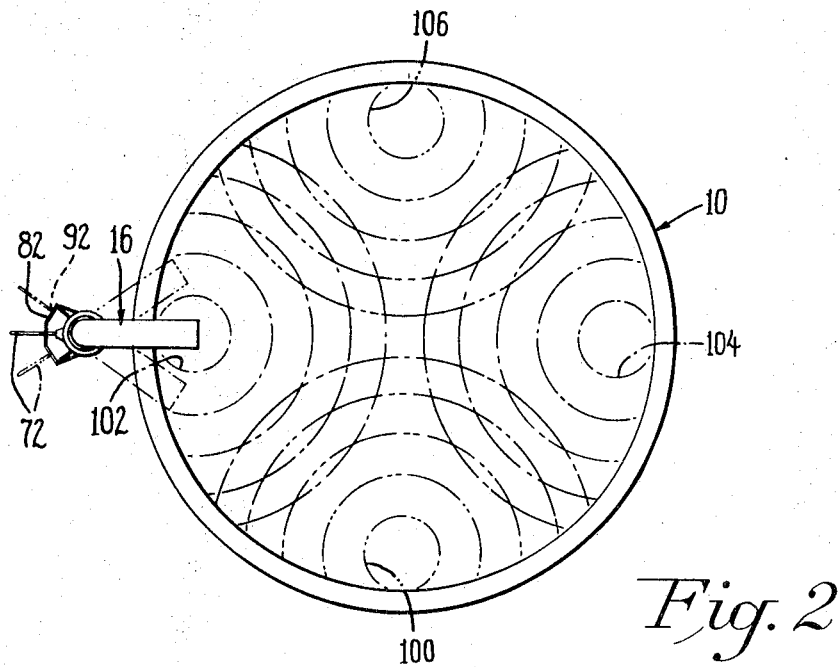
FIG. 2 is a diagrammatic showing of the top of a silo and indicating the preferred material distribution pattern obtained with the silo distributor of this invention.

With lever 72 in the slot 92 the hood assembly 16, as indicated by one of the phantom line positions in FIG. 2, will direct material toward the phantom circle 100. With the lever arm 72 in slot 94, the hood assembly 16 will be in the full line position as shown in FIG. 2. Since the slot 94 is relatively deep, the lever arm 72 will be in the phantom line position shown in FIG. 3. This will result in the second as shown in FIG. 1. In this position, the hood assembly 16 directs material from the blower assembly 12 in a vertical direction toward the floor of the silo at level A thus changing the direction of material flow approximately 180°. This results in the material being directed toward the center of the phantom circle 102 as shown in FIG. 2. The lever arm 72 will, when located in the hollow slot 96, place the hood assembly in the full line position as shown in FIG. 1 & 2. In this position, the outer portion 60 of the hood assembly 16 will direct material toward the far wall of the silo 10 to a position indicated by the phantom circle 104 in FIG. 2. The last slot 98 in the cam plate 82 will locate the lever arm 72 in such a position that the hood assembly 16 will direct material toward the center of the phantom circle 106 in FIG. 2.

In operation the operator will place the lever arm 72 in any one of the slots in the cam plate 82. After a certain amount of material has been deposited in a predetermined location within the silo, the operator will move the lever arm 72 to another one of the slots. While the lever arm 72 is in the second slot the operator will again allow a quantity of material to be deposited in a second position within the silo which has been predetermined by the slot in the cam plate that positions the lever arm 72. The operator will continue to move the lever arm 72 periodically to other slots until the lever arm has been in each of the four slots. At this time the process of moving the lever arm from slot to slot will be started over. The particular slot into which the operator moves the lever arm 72 at a given time is up to the operator. If the operator sees that a large pile of material is being deposited in one particular area of the silo 10, he can move the lever arm 72 to deposit material in some other area of the silo.

When the silo is empty and material is being deposited on level A as shown in FIG. 1, the angle X at which material leaves the hood assembly 16 when depositing material on the far side of the silo 10 from the hood assembly as indicated by the phantom circle 104 is a relatively small angle. By the time the silo 10 has filled to level B as indicated in FIG. 1, the angle Y at which material must be discharged from the hood assembly 16 to be deposited in the center of the phantom circle 104 is considerably larger than the angle X. By the time the silo 10 is filled to level C, the material must be discharged from the hood assembly 16 an an angle Z in order to be deposited on the far side of the silo 10. In order to compensate for the change in the angle at which material must be discharged from the hood assembly 16, as the level of material in the silo 10 raises, the bracket 78 which attaches the chain 70 to the lever arm 72 is moved in steps from a point close to the pivot point formed by pin 74 to a point close to the end of the lever arm 72 as indicated by the phantom lines in FIG. 3 as the silo is filled. This will adjust the position of the outer portion 60 of the hood assembly 16 when the lever arm 72 is in the slots 92, 96, and 98. The position of the outer portion 60 of the hood assembly 16 will be changed only slightly, if at all, by moving the bracket 78 relative to the lever arm 72, since the centerline of the chain 70 is approximately perpendicular to the lever arm 72, when the lever arm is in the slot 94 as indicated by the phantom line position in FIG. 3. The outer portion 60 could also be controlled by a stop when the lever arm is in the slot 94 is desired.

The embodiments of the invention in which we claim: an exclusive property or privilege are defined as follows:

1. A material distributor control means, for use in combination with a blower for a silo, including in combination,
    a pipe for conveying material from said blower to the top of the silo,
    an adapter assembly for attaching the pipe to the blower discharge and for allowing the pipe to turn relative to the blower discharge,
    a hood assembly attached to the discharge end of the pipe for directing material to various parts of the silo, said hood assembly including first and second portions, said first portion being fixed relative to the pipe and said second portion being moveable relative to the first portion to vary the angle at which material is discharged from the hood assembly,
    a lever which is moveable in a first plane to turn the pipe relative to the blower and to thereby change the direction in which material is discharged from the hood,
    a cable means attached to the second portion of said hood assembly and said lever, said lever being moveable in a second plane to control the angle at which material is discharged from the hood, and
    cam means for positioning said lever in any one of two or more positions to locate said lever in predetermined positions in said first and said second planes to deposit material in two or more preselected positions in the silo.

2. The material distributor control means of claim 1 including means to adjust the position of the hood to obtain the desired material distribution pattern as the level of the material within the silo raises.

3. The material distributor control means of claim 1 wherein said cam means is a plate with a series of spaced slots of predetermined depth to give the desired distribution of material within the silo.

4. The material distributor control means of claim 1 wherein said lever is pivotally attached to said pipe.

5. The material distributor control means of claim 4 wherein the connecting means for attaching said cable to the lever is moveable relative to the lever and said means for attaching said cable to the lever is moved away from the pivotal connection with the pipe, as the silo is filled to maintain the desired distribution of material within the silo.

6. The material distributor control means of claim 1 wherein said adapter assembly for attaching the pipe to the blower includes a base and flexible means to provide for slight misalignment between the blower and the pipe.

7. The material distributor control means of claim 6 wherein said cam means is attached to the base of the adapter assembly.

8. The material distributor control means of claim 7 wherein said lever is pivotally attached to the adapter assembly for pivotal movement about a substantially horizontal axis.